United States Patent
Lai et al.

(10) Patent No.: US 11,949,920 B2
(45) Date of Patent: Apr. 2, 2024

(54) METHOD AND APPARATUS FOR CONTORLLING COEFFICIENT TRANSMISSION BY EARLY DETERMINING WHETHER TO DECODE INFORMATION THAT INVERSE TRANSFORM NEEDS

(71) Applicant: MEDIATEK INC., Hsin-Chu (TW)

(72) Inventors: Ming-Hsien Lai, Hsinchu (TW); Min-Hao Chiu, Hsinchu (TW); Chia-Yun Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 72 days.

(21) Appl. No.: 17/871,976

(22) Filed: Jul. 24, 2022

(65) Prior Publication Data

US 2023/0122258 A1 Apr. 20, 2023

Related U.S. Application Data

(60) Provisional application No. 63/257,627, filed on Oct. 20, 2021.

(51) Int. Cl.
| | |
|---|---|
| *H04N 19/89* | (2014.01) |
| *H04N 19/176* | (2014.01) |
| *H04N 19/60* | (2014.01) |
| *H04N 19/70* | (2014.01) |

(52) U.S. Cl.
CPC .......... *H04N 19/89* (2014.11); *H04N 19/176* (2014.11); *H04N 19/60* (2014.11); *H04N 19/70* (2014.11)

(58) Field of Classification Search
CPC ...... H04N 19/89; H04N 19/176; H04N 19/60; H04N 19/70; H04N 19/12; H04N 19/132; H04N 19/157; H04N 19/44; H04N 19/61
See application file for complete search history.

(56) References Cited

U.S. PATENT DOCUMENTS

2017/0163988 A1* 6/2017 Lu .................. H04N 19/159

FOREIGN PATENT DOCUMENTS

| TW | 202041022 A | 11/2020 |
| TW | 202046719 A | 12/2020 |

\* cited by examiner

*Primary Examiner* — Nam D Pham
(74) *Attorney, Agent, or Firm* — Winston Hsu

(57) ABSTRACT

A video decoding method includes: before residual decoding of a coding unit is completed, referring to available information to determine whether to decode information that an inverse transform (IT) circuit needs for applying inverse transform to transform blocks of the coding unit, and generating a determination result; and controlling coefficient transmission of the coding unit to the IT circuit according to the determination result.

16 Claims, 6 Drawing Sheets

```
coding_unit(x0,y0,cbWidth,cbHeight,cqtDepth,treeType,modeType) {
    if( sh_slice_type == I && ( cbWidth > 64 || cbHeight > 64 ) )
        modeType = MODE_TYPE_INTRA
        ⋮
    MtsZeroOutSigCoeffFlag = 1
    transform_tree(x0,y0,cbWidth,cbHeight,treeType,chType) → Residual decoding
    lfnstWidth = ( treeType == DUAL_TREE_CHROMA )?cbWidth/SubWidthC :
                 ( ( IntraSubPartitionsSplitType == ISP_VER_SPLIT )?
                   cbWidth / NumIntraSubPartitions : cbWidth )
        ⋮
```

202 ⎰
```
    if( Min(lfnstWidth,lfnstHeight) >= 4 && sps_lfnst_enabled_flag == 1 &&
      CuPredMode[chType][x0][y0] == MODE_INTRA && lfnstNotTsFlag == 1
      &&
      (treeType == DUAL_TREE_CHROMA || !IntraMipFlag[x0][y0] ||
          Min(lfnstWidth,lfnstHeight) >= 16 )  &&       ⟍212
          Max( cbWidth, cbHeight ) <= MaxTbSizeY) {
      if( ( IntraSubPartitionsSplitType != ISP_NO_SPLIT || LfnstDcOnly == 0 )
      &&                                                      ⟍214
          LfnstZeroOutSigCoeffFlag == 1 )
                            ⟍216
          lfnst_idx → Info IT needs
    }
```

204 ⎰
```
    if( treeType != DUAL_TREE_CHROMA && lfnst_idx == 0 &&
        transform_skip_flag[x0][y0][0] == 0 && Max( cbWidth, cbHeight ) <=
    32 &&
        IntraSubPartitionsSplitType == ISP_NO_SPLIT && cu_sbt_flag == 0
        &&
    222  MtsZeroOutSigCoeffFlag == 1 && MtsDcOnly == 0 ) {   ⟍218
                                          224
        if( ( ( CuPredMode[chType][x0][y0] == MODE_INTER &&
            sps_explicit_mts_inter_enabled_flag ) ||
            ( CuPredMode[chType][x0][y0] == MODE_INTRA &&     ⎯220
            sps_explicit_mts_intra_enabled_flag ) ) )
        mts_idx → Info IT needs
```

FIG. 2

METHOD AND APPARATUS FOR CONTORLLING COEFFICIENT TRANSMISSION BY EARLY DETERMINING WHETHER TO DECODE INFORMATION THAT INVERSE TRANSFORM NEEDS

CROSS REFERENCE TO RELATED APPLICATIONS

This application claims the benefit of U.S. Provisional Application No. 63/257,627, filed on Oct. 20, 2021. The content of the application is incorporated herein by reference.

BACKGROUND

The present invention relates to video processing, and more particularly, to a method and apparatus for controlling coefficient transmission by early determining whether to decode information that inverse transform needs.

The conventional video coding standards generally adopt a block based coding technique to exploit spatial and temporal redundancy. For example, the basic approach is to divide the whole source picture into a plurality of blocks, perform intra/inter prediction on each block, transform residuals of each block, and perform quantization and entropy encoding. Besides, a reconstructed picture is generated in a coding loop to provide reference pixel data used for coding following blocks. For certain video coding standards, in-loop filter(s) may be used for enhancing the image quality of the reconstructed frame. The video decoder is used to perform an inverse operation of a video encoding operation performed by a video encoder. For example, the video decoder may include an entropy decoding circuit, an inverse scan circuit, an inverse transform circuit, etc. The operation of the inverse transform circuit may be configured by values of certain syntax elements. In accordance with a syntax decoding flow specified by a versatile video coding (VVC) standard (also known as H.266 standard), the information that the inverse transform circuit needs for applying inverse transform to transform blocks of a coding unit may be decoded by the entropy decoding circuit after residual decoding of the coding unit is fully completed by the entropy decoding circuit. As a result, the inverse transform circuit does not start to apply inverse transform to transform blocks of the coding unit until information that the inverse transform circuit needs is determined. Furthermore, the inverse scan circuit needs a large buffer to keep the residual decoding result of the coding unit before information that the inverse transform circuit needs is determined.

Thus, there is a need for an innovative video decoder design which is capable of enhancing the performance of the inverse transform circuit and/or reducing the buffer requirement of the inverse scan circuit.

SUMMARY

One of the objectives of the claimed invention is to provide a method and apparatus for controlling coefficient transmission by early determining whether to decode information (e.g. syntax elements lfnst_idx and mts_idx) that inverse transform needs.

According to a first aspect of the present invention, an exemplary video decoding method is disclosed. The exemplary video decoding method includes: before residual decoding of a coding unit is completed, referring to available information to determine whether to decode information that an inverse transform (IT) circuit needs for applying inverse transform to transform blocks of the coding unit, and generating a determination result; and controlling coefficient transmission of the coding unit to the IT circuit according to the determination result.

According to a second aspect of the present invention, an exemplary video decoding apparatus is disclosed. The exemplary video decoding apparatus includes an entropy decoding circuit, an inverse scan (IS) circuit, and an inverse transform (IT) circuit. The entropy decoding circuit is arranged to perform residual decoding of a coding unit. The IT circuit is arranged to apply inverse transform to transform blocks of the coding unit. The IS circuit is coupled between the entropy decoding circuit and the IT circuit, and is arranged to re-order coefficients of the coding unit. Before the residual decoding of the coding unit is completed, at least one of the entropy decoding circuit and the IS circuit is arranged to determine whether the entropy decoding circuit needs to decode information that the IT circuit needs for applying the inverse transform to the transform blocks of the coding unit, to generate a determination result, and is further arranged to control coefficient transmission of the coding unit to the IT circuit according to the determination result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a part of a syntax decoding flow for one coding unit as specified by the VVC standard.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
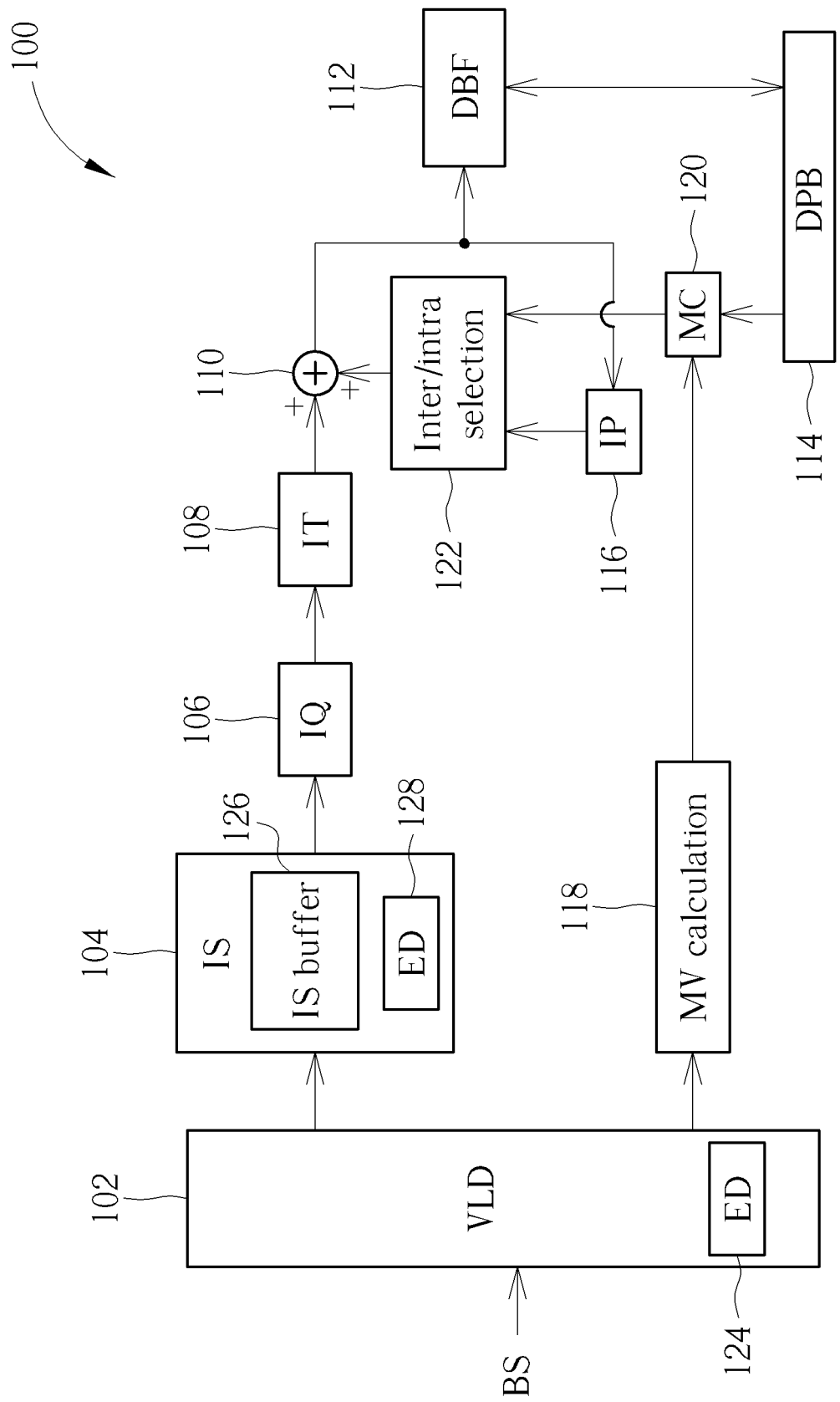
FIG. 1 is a block diagram illustrating a video decoding apparatus according to an embodiment of the present invention.

FIG. 1 is a block diagram illustrating a video decoding apparatus according to an embodiment of the present invention. The video decoding apparatus 100 is a hardware circuit used to decompress encoded video data to generate decompressed video data. As shown in FIG. 1, the video decoding apparatus 100 may include an entropy decoding circuit (e.g. a variable length decoding circuit 102, labeled by "VLD"), an inverse scan circuit (labeled by "IS") 104, an inverse quantization circuit (labeled by "IQ") 106, an inverse transform circuit (labeled by "IT") 108, a reconstruction circuit 110, an in-loop filter (e.g. de-blocking filter 112, labeled by "DBF"), a decoded picture buffer (DPB) 114, an intra prediction circuit (labeled by "IP") 116, a motion vector calculation circuit (labeled by "MV calculation") 118, a motion compensation circuit (labeled by "MC") 120, and an inter/intra selection circuit (labeled by Inter/intra selection") 122. The variable length decoding (VLD) circuit 102 is used for entropy decoding the encoded bitstream BS. For example, the VLD circuit 102 is responsible for syntax parsing, residual decoding, etc. The inverse scan (IS) circuit 104 is used for re-ordering residuals (coefficients) derived from residual decoding at the VLD circuit 102. The inverse transform (IT) circuit 108 is used for applying inverse transform to each transform block to transform residuals from a frequency domain to a spatial domain. Since the present invention is focused on coefficient transmission from the IS circuit 104 to the IT circuit 108 and a person skilled in the art should readily understand principles of the rest of function blocks in the video decoding apparatus 100, further description of the video decoding apparatus 100 is omitted here for brevity.

It should be noted that the video decoder architecture shown in FIG. 1 is for illustrative purposes only, and is not meant to be a limitation of the present invention. For example, the architecture of the video decoding apparatus 100 may be adjusted, depending upon the coding standard. That is, additional coding tools, pre-processing, and/or post-processing may be added to the video decoding apparatus 100. For better comprehension of technical features of the present invention, the following assumes that the video decoding apparatus 100 is a VVC/H.266 decoder. In practice, any video decoding apparatus using the proposed techniques to enhance the performance of the inverse transform circuit and/or reduce the buffer requirement of the inverse scan circuit falls within the scope of the present invention. In contrast to a typical VVC/H.266 decoder design, the video decoding apparatus 100 supports an early determination scheme and/or a reduced buffer size. Further details are provided as below with reference to the accompanying drawings.

One picture may be divided into a plurality of coding units (CUs), each CU may be divided into a plurality of transform units (TUs), and each TU may consist of multiple transform blocks (TBs). For example, one TU may consist of one luma TB and two chroma TBs. In accordance with an original syntax decoding flow specified by the VVC standard, information that the IT circuit 108 needs for applying inverse transform to transform blocks of a coding unit is decoded by the VLD circuit 102 after residual decoding of the coding unit is fully completed by the VLD circuit 102. FIG. 2 is a diagram illustrating a part of a syntax decoding flow for one coding unit as specified by the VVC standard. In accordance with the VVC standard, the information that the IT circuit 108 needs includes a syntax element lfnst_idx and a syntax element mts_idx. Regarding low frequency non-separable transform (LFNST), the syntax element lfnst_idx specifies whether and which one of the two low frequency non-separable transform kernels in a selected transform set is used. lfnst_idx equal to 0 specifies that the low frequency non-separable transform is not used in the current coding unit. When lfnst_idx is not present, it is inferred to be equal to 0 (i.e. default value=0). Regarding multi transform selection (MTS), the syntax element mts_idx specifies which transform kernels are applied along the horizontal and vertical direction of the associated luma transform blocks in the current coding unit. When mts_idx is not present, it is inferred to be equal to 0 (i.e. default value=0). The syntax element lfnst_idx is present in the encoded bitstream BS when these conditions specified in the code segment 202 are all met. Hence, the VLD circuit 102 needs to parse the syntax element lfnst_idx from the encoded bitstream BS when these conditions specified in the code segment 202 are all met. The syntax element mts_idx is present in the encoded bitstream BS when these conditions specified in the code segment 204 are all met. Hence, the VLD circuit 102 needs to parse syntax element mts_idx from the encoded bitstream BS when these conditions specified in the code segment 204 are all met.

The code segment 202 includes partial code segments 212, 214 and 216. The code segment 204 includes partial code segments 218, 220, 222, and 224. High level information (which can be obtained before residual decoding of the current coding unit is started) is checked by the partial code segments 212, 218 and 220. The other four variables LfnstDcOnly, LfnstZeroOutSigCoeffFlag, MtsZeroOutSigCoeffFlag, MtsDcOnly (which are not available before residual decoding of the current coding unit is started, and can be determined during a process of the residual decoding of the current coding unit) are checked by the partial code segments 214, 216, 222, and 224. Since all of the high level information and the other four variables can be available before residual decoding of the current coding unit is fully completed by the VLD circuit 102, whether to decode the information (e.g. syntax elements lfnst_idx and mts_idx) needed by the IT circuit 108 may be early determined, which allows a start time of coefficient transmission to the IT circuit 108 to be earlier than an end time of residual decoding of the current coding unit.

Based on above observations, the present invention proposes a VLD circuit equipped with an early determination function and an IS circuit equipped with an early determination function. As shown in FIG. 1, the VLD circuit 102 includes an early determination circuit (labeled by "ED") 124, and the IS circuit 104 includes an IS buffer 126 and an early determination circuit (labeled by "ED") 128. Before residual decoding of a coding unit is fully completed by the VLD circuit 102, at least one of VLD circuit 102 and IS circuit 104 (particularly, at least one of early determination circuits 124 and 128) is arranged to determine whether the VLD circuit 102 needs to decode information that the IT circuit 108 needs for applying inverse transform to transform blocks of the coding unit, to generate a determination result, and is further arranged to control coefficient transmission of the coding unit to the IT circuit 108 according to the determination result. Specifically, since the high level information can be obtained before residual decoding of a current coding unit is started, the VLD circuit 102 (particularly, early determination circuit 124 of VLD circuit 102) can refer to the available high level information to determine if the syntax element lfnst_idx can be early determined to be equal to a default value (e.g. 0) before residual decoding of the current coding unit is fully completed. When the syntax element lfnst_idx can be early determined to be equal to a default value (e.g. 0), no syntax parsing flow of the syntax element lfnst_idx is needed after residual decoding of the current coding unit is fully completed. In addition, since coefficients obtained from residual decoding of the current coding unit are stored into the IS buffer 126, the IS circuit 104 (particularly, early determination circuit 128 of IS circuit 104) can refer to the available information buffered in the IS buffer 126 to determine if the syntax element mts_idx can be early determined to be equal to a default value (e.g. 0) before residual decoding of the current coding unit is fully completed. When the syntax element mts_idx can be early determined to be equal to a default value (e.g. 0), no syntax parsing flow of the syntax element mts_idx is needed after residual decoding of the current coding unit is fully completed. In a case where both of the syntax elements lfnst_idx and mts_idx can be early determined by the proposed early determination scheme, coefficient transmission from the IS buffer 126 to the IT circuit 108 is allowed to be started at a time point earlier than an end time of residual decoding of the current coding unit.

Figure 3:
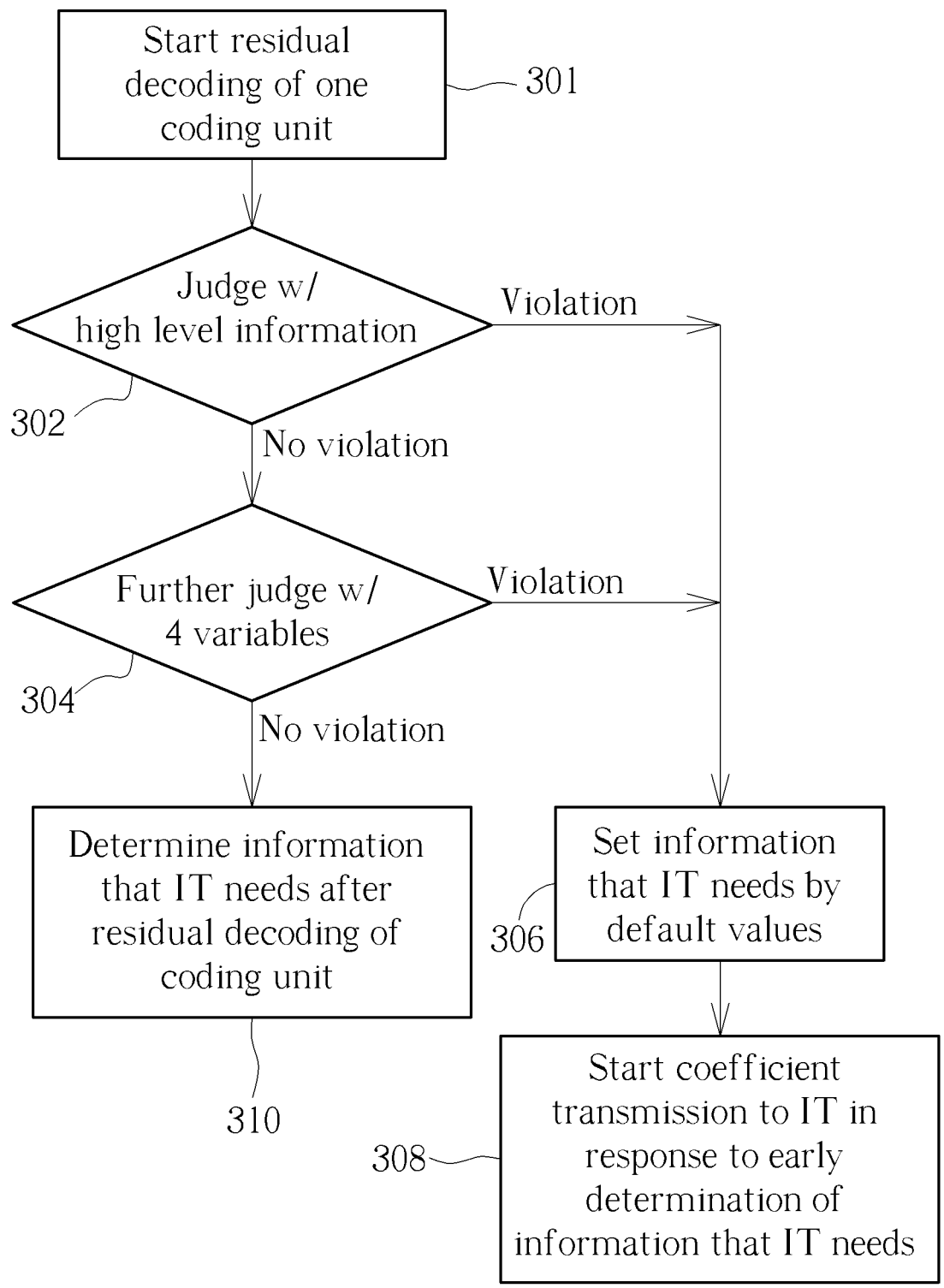
FIG. 3 is a diagram illustrating a video decoding method according to an embodiment of the present invention.

FIG. 3 is a diagram illustrating a video decoding method according to an embodiment of the present invention. Provided that the result is substantially the same, the steps are not required to be executed in the exact order shown in FIG. 3. After a syntax decoding flow of a current coding unit is started at step 301, the early determination circuit 124 checks high level information (which is available before residual decoding of the current coding unit is started) to determine if at least one of conditions specified by the partial code segment 212 for decoding of the syntax element lfnst_idx and at least one of conditions specified by the partial code segments 218, 220 for decoding of the syntax element mts_idx are violated (step 302). If violation occurs, it is judged that there is no need to decode/parse the information (lfnst_idx & mts_idx) that the IT circuit 108 needs from the encoded bitstream BS, and the flow proceeds with step 306. If no violation occurs, it is possible that the VLD circuit 102 may need to decode/parse the information (lfnst_idx & mts_idx) that the IT circuit 108 needs from the encoded bitstream BS, and the flow proceeds with step 304 to do another check. At step 304, the early determination circuit 128 checks the other four variables (which are not available before residual decoding of the current coding unit, and can be determined during a process of residual decoding of the current coding unit) to determine if at least one of conditions specified by the partial code segments 214, 216 for decoding of the syntax element lfnst_idx and at least one of conditions specified by the partial code segments 218, 220 for decoding of the syntax element mts_idx are violated. If violation occurs, it is judged that there is no need to decode/parse the information (lfnst_idx & mts_idx) that the IT circuit needs from the encoded bitstream BS, and the flow proceeds with step 306. If no violation occurs, it is confirmed that the VLD circuit 102 needs to decode/parse the information (lfnst_idx & mts_idx) that the IT circuit 108 needs from the encoded bitstream BS, and the flow proceeds with step 310. At step 310, the VLD circuit 102 will follow a normal syntax decoding flow to determine a value of the syntax element lfnst_idx and a value of the syntax element mts_idx after residual decoding of the current coding unit is fully completed.

Figure 4:
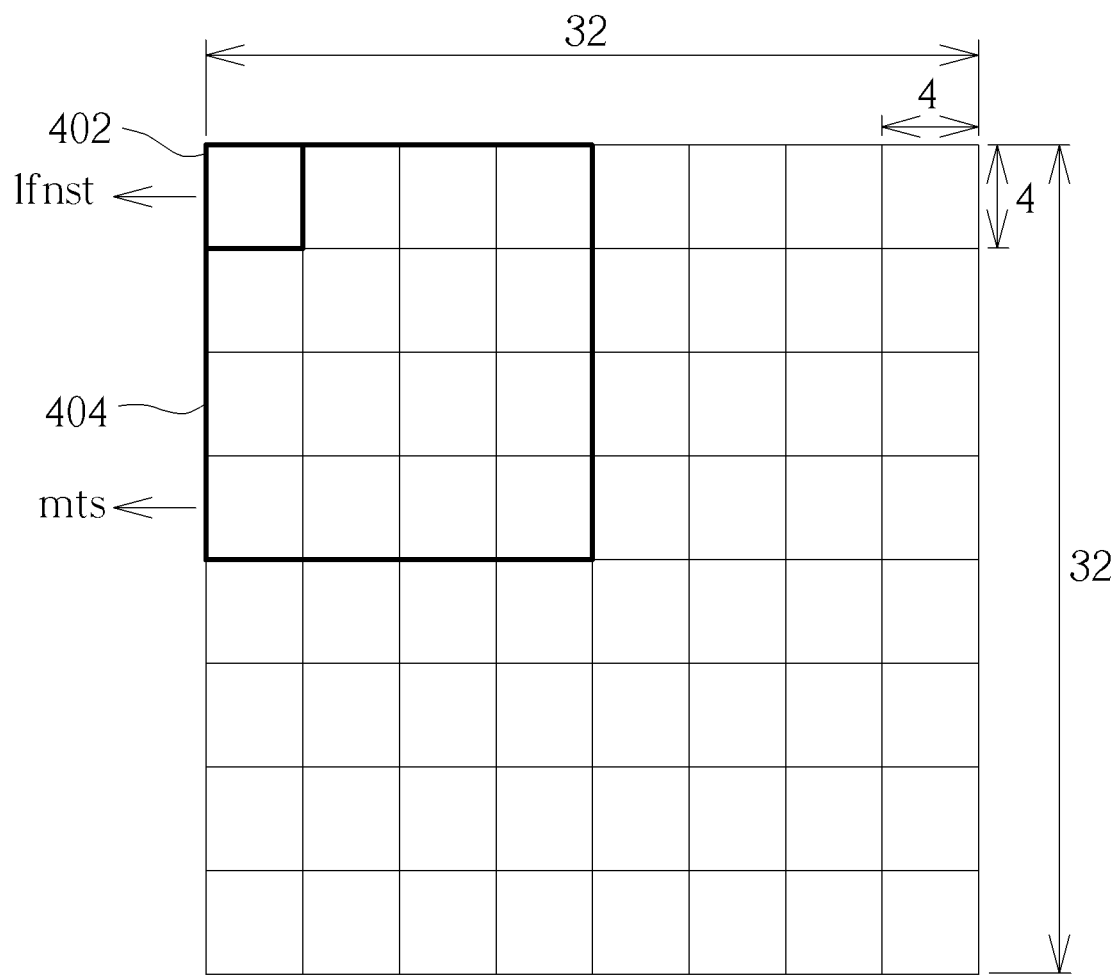
FIG. 4 is a diagram illustrating a 32×32 transform block according to an embodiment of the present invention.

Assume that all TBs in one CU are 32×32 TBs as illustrated in FIG. 4. Taking the variable LfnstZeroOutSigCoeffFlag for example, it is used to indicate if residuals (non-zero coefficients) in all the TBs in this CU occupy a left-top 4×4 region 402 only. When residuals (non-zero coefficients) in each of the 32×32 TBs occupy the left-top 4×4 region 402 only, LfnstZeroOutSigCoeffFlag=1. However, when residuals (non-zero coefficients) in at least one of the 32×32 TBs do not occupy the left-top 4×4 region 402 only, it can be early determined that LfnstZeroOutSigCoeffFlag=0, which implies that the VLD circuit 102 won't parse the syntax element lfnst_idx from the encoded bitstream BS (i.e. there is no need to decode the syntax element lfnst_idx that the IT circuit 108 needs). It should be noted that, if the TB size is 4×4 or 8×8, the residuals (non-zero coefficients) can occupy scan_pos<8 in the left-top 4×4 region.

Assume that all the luma TBs in this CU are 32×32 luma TBs as illustrated in FIG. 4. Taking the variable MtsZeroOutSigCoeffFlag for example, it is used to indicate if residuals (non-zero coefficients) in all the luma TBs in this CU occupy a left-top 16×16 region 404 only. When residuals (non-zero coefficients) in each of the 32×32 luma TBs occupy the left-top 16×16 region 404 only, MtsZeroOutSigCoeffFlag=1. However, when residuals (non-zero coefficients) in at least one of the 32×32 luma TBs do not occupy the left-top 16×16 region 404 only, it can be early determined that MtsZeroOutSigCoeffFlag=0, which implies that the VLD circuit 102 won't parse the syntax element mts_idx from the encoded bitstream BS (i.e. there is no need to decode the syntax element mts_idx that the IT circuit 108 needs).

When MtsZeroOutSigCoeffFlag=0 and LfnstZeroOutSigCoeffFlag=0 are early determined by the early determination circuit 128 according to coefficients stored in the IS buffer 126 (step 304), the flow proceeds with step 306.

At step 306, the VLD circuit 102 directly sets the information (lfnst_idx & mts_idx) that the IT circuit 108 needs by default values with no decoding/parsing of the information (lfnst_idx & mts_idx). For example, the syntax element lfnst_idx is inferred to be a default value (e.g. 0), and the syntax element mts_idx is inferred to be a default value (e.g. 0). At step 308, the IS circuit 104 starts coefficient transmission in response to early determination of syntax values of lfnst_idx and mts_idx. Since syntax values of lfnst_idx and mts_idx can be early determined before residual decoding of the current coding unit is fully completed by the VLD circuit 102, the coefficient transmission from the IS circuit 104 (particularly, IS buffer 126 of IS circuit 104) to the IT circuit 108 via the IQ circuit 106 is allowed to be early started before residual decoding of the current coding unit is fully completed by the VLD circuit 102. In this way, the performance of the IT circuit 108 can be improved greatly.

Figure 5:
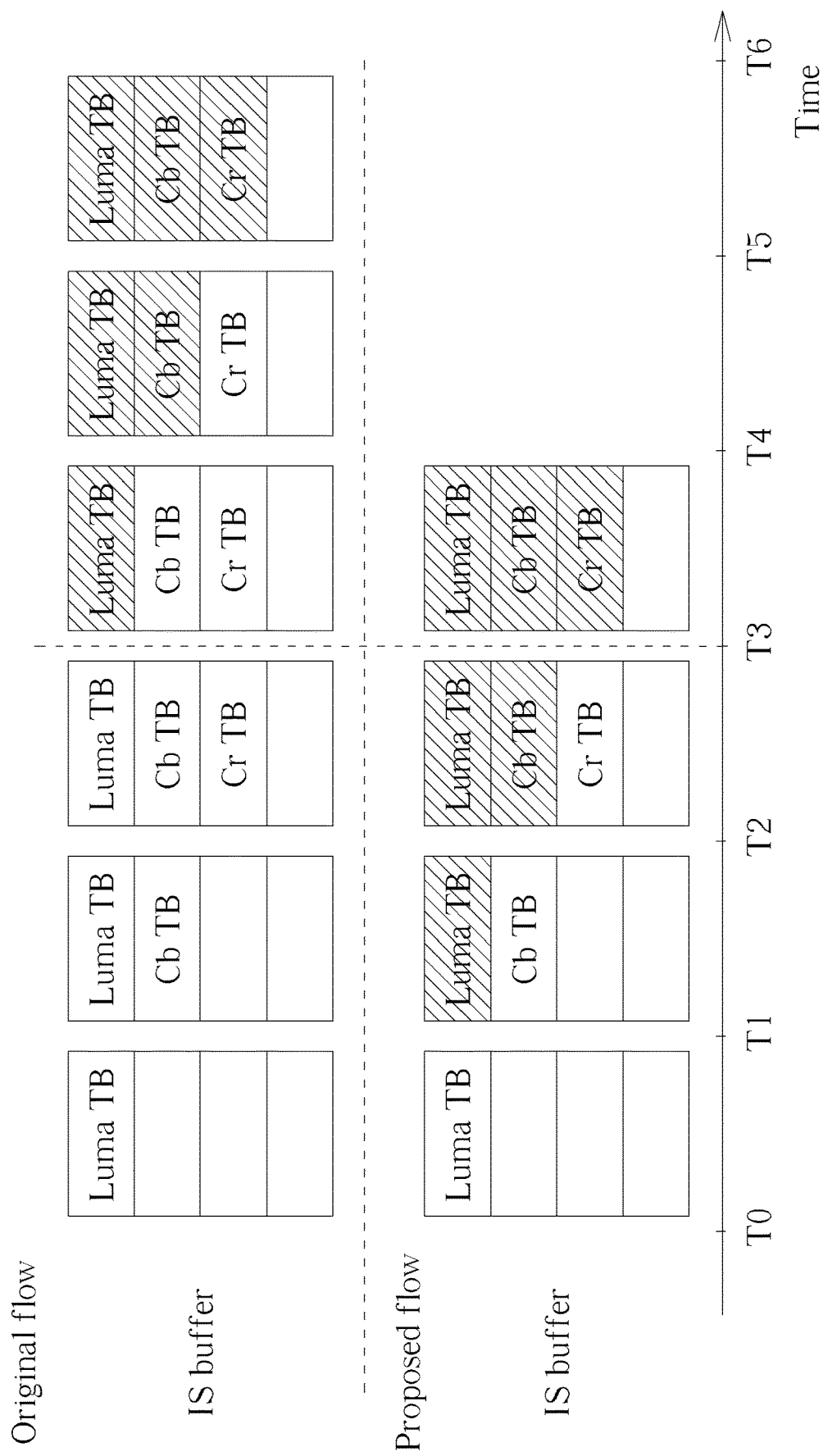
FIG. 5 is a diagram illustrating one performance comparison between an original syntax decoding flow of the VVC standard and a proposed syntax decoding flow of the present invention.

FIG. 5 is a diagram illustrating one performance comparison between an original syntax decoding flow of the VVC standard and a proposed syntax decoding flow of the present invention. Assume that one CU has 3 TBs in a single-tree case. According to the original syntax decoding flow as specified by the VVC standard, a typical VLD circuit performs residual decoding for a luma TB during a period between time points T0 and T1. Since the residual decoding of the current CU is not completed at this moment, the IT-related syntax elements lfnst_idx and mts_idx are not determined yet, and the residual decoding result (i.e. transform coefficients) of the luma TB has to be buffered in a typical IS buffer. Next, the typical VLD circuit performs residual decoding for one chroma TB (e.g. Cb TB) during a period between time points T1 and T2. Since the IT-related syntax elements lfnst_idx and mts_idx are not determined yet, the residual decoding result (i.e. transform coefficients) of the chroma TB (e.g. Cb TB) has to be buffered in the typical IS buffer. Next, the typical VLD circuit performs residual decoding for the other chroma TB (e.g. Cr TB) during a period between time points T2 and T3. Since the IT-related syntax elements lfnst_idx and mts_idx are not determined yet, the residual decoding result (i.e. transform coefficients) of the chroma TB (e.g. Cr TB) has to be buffered in the typical IS buffer. Since the residual decoding of the current CU is completed at the time point T3, the typical VLD circuit determines the IT-related syntax elements lfnst_idx and mts_idx for the current CU. For example, the IT-related syntax elements lfnst_idx and mts_idx may be decoded from an encoded bitstream. For another example, the IT-related syntax elements lfnst_idx and mts_idx may not be present in the encoded bitstream, and may be inferred to be default values. After the IT-related syntax elements lfnst_idx and mts_idx are determined at the time point T3, coefficient transmission from the IS buffer to the IT circuit is initiated. For example, the IS buffer outputs the residual decoding result (i.e. transform coefficients) of the luma TB to the IT circuit through an IQ circuit during a period between time points T3 and T4, outputs the residual decoding result (i.e. transform coefficients) of one chroma TB (e.g. Cb TB) to the IT circuit through the IQ circuit during a period between time points T4 and T5, and outputs the residual decoding result (i.e. transform coefficients) of the other chroma TB (e.g. Cr TB) to the IT circuit through the IQ circuit during a period between time points T5 and T6.

According to the proposed syntax decoding flow with an early determination scheme, the early determination circuit 124 may refer to the high level information to judge that the VLD circuit 102 may still need to decode the IT-related syntax elements lfnst_idx and mts_idx from the encoded bitstream BS. In addition, the VLD circuit 102 performs residual decoding for a luma TB during a period between time points T0 and T1, and stores the residual decoding result (i.e. transform coefficients) of the luma TB into the IS buffer 126. At the time point T1, the early determination circuit 128 may find that the luma TB has residuals (non-zero coefficients) occupying outside the left-top 16×16 region, meaning that MTS and LFNST conditions are both violated. Hence, at the time point T1, it is early determined that there is no need to decode the IT-related syntax elements lfnst_idx and mts_idx from the encoded bitstream BS, and the IT-related syntax elements lfnst_idx and mts_idx are inferred to be default values. Since the IT-related syntax elements lfnst_idx and mts_idx are early determined at the time point T1, the IS buffer 126 outputs the residual decoding result (i.e. transform coefficients) of the luma TB to the IT circuit 108 through the IQ circuit 106 during a period between time points T1 and T2. In addition, the VLD circuit 102 performs residual decoding for one chroma TB (e.g. Cb TB) during the same period between time points T1 and T2, and stores the residual decoding result (i.e. transform coefficients) of the chroma TB (e.g. Cb TB) into the IS buffer 126. During a period between time points T2 and T3, the IS buffer 126 outputs the residual decoding result (i.e. transform coefficients) of the chroma TB (e.g. Cb TB) to the IT circuit 108 through the IQ circuit 106, and the VLD circuit 102 performs residual decoding for the other chroma TB (e.g. Cr TB) and stores the residual decoding result (i.e. transform coefficients) of the chroma TB (e.g. Cr TB) into the IS buffer 126. During a period between time points T3 and T4, the IS buffer 126 outputs the residual decoding result (i.e. transform coefficients) of the chroma TB (e.g. Cr TB) to the IT circuit 108 through the IQ circuit 106. Compared to the original syntax decoding flow as specified by the VVC standard, the proposed syntax decoding flow enables coefficient transmission to the IT circuit earlier, thereby improving the video decoding performance greatly.

Figure 6:
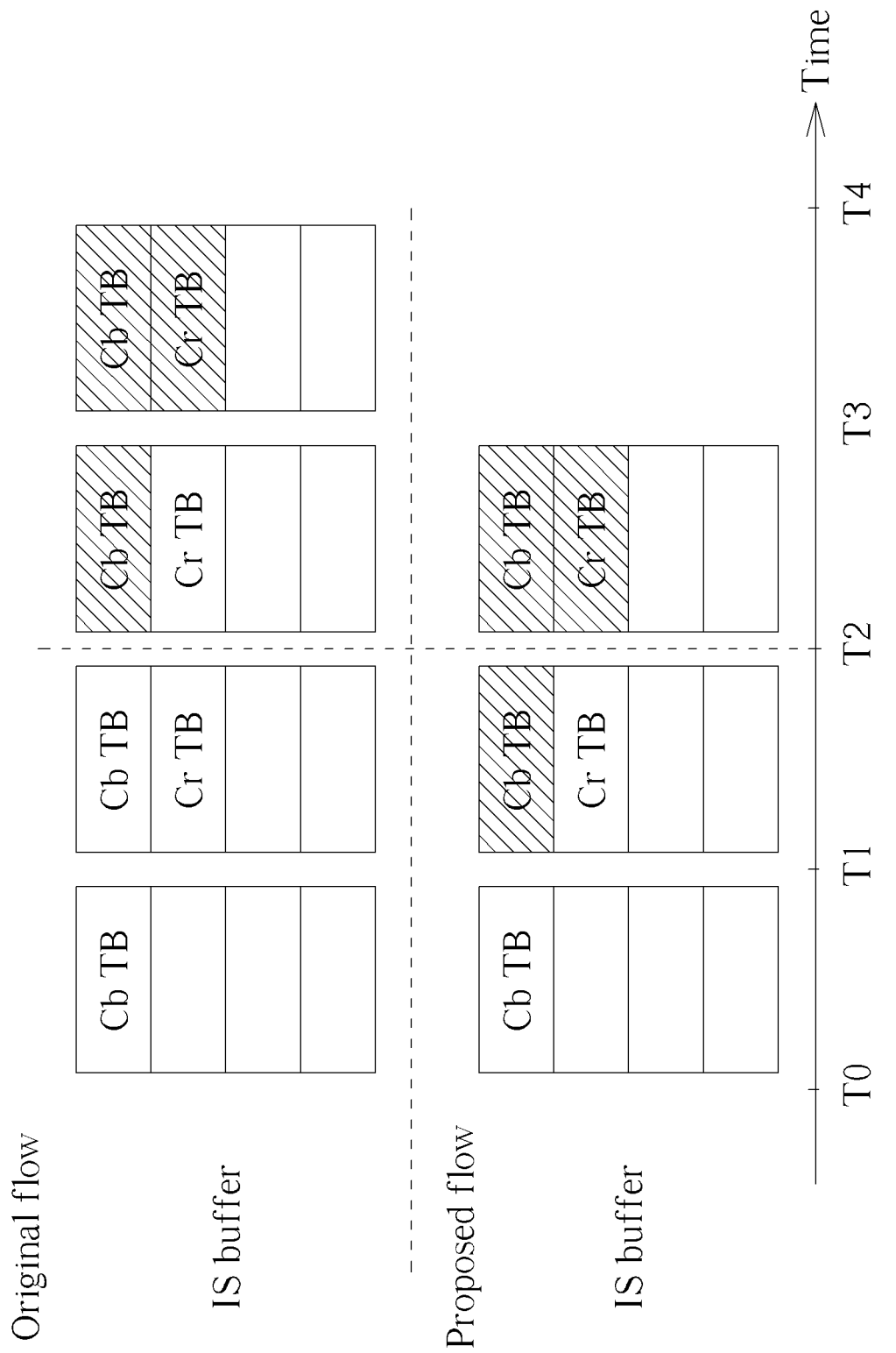
FIG. 6 is a diagram illustrating another performance comparison between an original syntax decoding flow of the VVC standard and a proposed syntax decoding flow of the present invention.

FIG. 6 is a diagram illustrating another performance comparison between an original syntax decoding flow of the VVC standard and a proposed syntax decoding flow of the present invention. Assume that one CU has 2 TBs in a dual-chroma-tree case. Since there is no luma TB, only the LFNST condition needs to be checked. According to the original syntax decoding flow as specified by the VVC standard, a typical VLD circuit performs residual decoding for one chroma TB (e.g. Cb TB) during a period between time points T0 and T1. Since the residual decoding of the current CU is not completed at this moment, the IT-related syntax element lfnst_idx is not determined yet, and the residual decoding result (i.e. transform coefficients) of the chroma TB (e.g. Cb TB) has to be buffered in a typical IS buffer. Next, the typical VLD circuit performs residual decoding for the other chroma TB (e.g. Cr TB) during a period between time points T1 and T2. Since the IT-related syntax element lfnst_idx is not determined yet, the residual decoding result (i.e. transform coefficients) of the chroma TB (e.g. Cr TB) has to be buffered in the typical IS buffer. Since the residual decoding of the current CU is completed at the time point T2, the typical VLD circuit determines the IT-related syntax element lfnst_idx for the current CU. For example, the IT-related syntax element lfnst_idx may be decoded from an encoded bitstream. For another example, the IT-related syntax element lfnst_idx may not be present in the encoded bitstream, and may be inferred to be a default value. After the IT-related syntax element lfnst_idx is determined at the time point T2, coefficient transmission from the IS buffer to the IT circuit is initiated. For example, the IS buffer outputs the residual decoding result (i.e. transform coefficients) of one chroma TB (e.g. Cb TB) to the IT circuit through the IQ circuit during a period between time points T2 and T3, and outputs the residual decoding result (i.e. transform coefficients) of the other chroma TB (e.g. Cr TB) to the IT circuit through an IQ circuit during a period between time points T3 and T4.

According to the proposed syntax decoding flow with an early determination scheme, the early determination circuit 124 may refer to the high level information to judge that the VLD circuit 102 may still need to decode the IT-related syntax element lfnst_idx from the encoded bitstream BS. In addition, the VLD circuit 102 performs residual decoding for one chroma TB (e.g. Cb TB) during a period between time points T0 and T1, and stores the residual decoding result (i.e. transform coefficients) of the chroma TB (e.g. Cb TB) into the IS buffer 126. At the time point T1, the early determination circuit 128 may find that the chroma TB has residuals (non-zero coefficients) occupying outside the left-top 4×4 region, meaning that LFNST condition is violated. Hence, at the time point T1, it is early determined that there is no need to decode the IT-related syntax element lfnst_idx from the encoded bitstream BS, and the IT-related syntax element lfnst_idx is inferred to be a default value. Since the IT-related syntax element lfnst_idx is early determined at the time point T1, the IS buffer 126 outputs the residual decoding result (i.e. transform coefficients) of the chroma TB (e.g. Cb TB) to the IT circuit 108 through the IQ circuit 106 during a period between time points T1 and T2. In addition, the VLD circuit 102 performs residual decoding for the other chroma TB (e.g. Cr TB) during the same period between time points T1 and T2, and stores the residual decoding result (i.e. transform coefficients) of the chroma TB (e.g. Cr TB) into the IS buffer 126. During a period between time points T2 and T3, the IS buffer 126 outputs the residual decoding result (i.e. transform coefficients) of the chroma TB (e.g. Cr TB) to the IT circuit 108 through the IQ circuit 106. Compared to the original syntax decoding flow as specified by the VVC standard, the proposed syntax decoding flow enables coefficient transmission to the IT circuit earlier, thereby improving the video decoding performance greatly.

Regarding the code segment 202 shown in FIG. 2, a coding block size constraint Max(cbWidth, cbHeight) <=MaxTbSizeY is involved in determining whether to decode the syntax element lfnst_idx. Regarding the code segment 218 shown in FIG. 2, a coding block size constraint Max(cbWidth, cbHeight)<=32 is involved in determining whether to decode the syntax element mts_idx. These coding block size constraints imply a smaller IS buffer size for residual decoding of one CU. If these coding block size constraints are not considered when setting an IS buffer size, the typical IS buffer may be configured to have a buffer size that is large enough to accommodate 128×128×1.5 residuals (coefficients) under a worst case where a CU has a largest CU size of 128×128 in a shared tree case.

Since the above-mentioned coding block size constraints imply a smaller IS buffer size for residual decoding of one CU, the present invention can take the advantage of the coding block size constraints for achieving an objective of reducing the buffer requirement of the IS circuit 104. If the transform block size is not larger than 32, the VLD circuit 102 may have the chance to decode the IT-related syntax elements lfnst_idx and mts_idx from the encoded bitstream BS. In a case where the proposed syntax decoding flow with an early determination scheme is employed, the IS buffer may be required to have a buffer size that is large enough to accommodate 16×16+2×(16×16) residuals (coefficients) under a worst case where a CU has a CU size of 32×32 in a shared tree case, the luma residuals (coefficients) only occupy a left-top 16×16 region, and chroma residuals (coefficients) occupy the whole 16×16 region. With regard to a normal case, the IS buffer may be required to have a buffer size that is large enough to accommodate 32×32 residuals (coefficients). Hence, the buffer size of the IS buffer 126 may be set by 32×32, that is, max(16×16+2×(16×16), 32×32). To put it simply, the IS buffer 126 can be designed to have a buffer size being smaller than a maximum data amount of coefficients possessed by one CU with the largest CU size (e.g. 128×128). In this way, the buffer requirement of the IS circuit 104 can be relaxed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method comprising:
   before residual decoding of a coding unit is completed, referring to available information to determine whether to decode information that an inverse transform (IT) circuit needs for applying inverse transform to transform blocks of the coding unit, and generating a determination result; and
   controlling coefficient transmission of the coding unit to the IT circuit according to the determination result.

2. The video decoding method of claim 1, wherein referring to the available information to determine whether to decode the information that the IT circuit needs comprises:
   before the residual decoding of the coding unit is started, obtaining the available information.

3. The video decoding method of claim 1, wherein referring to the available information to determine whether to decode the information that the IT circuit needs comprises:
   during a process of the residual decoding of the coding unit, obtaining the available information.

4. The video decoding method of claim 1, wherein controlling the coefficient transmission of the coding unit to the IT circuit according to the determination result comprises:
   in response to the determination result indicating that there is no need to decode the information that the IT circuit needs, starting the coefficient transmission of the coding unit before the residual decoding of the coding unit is completed.

5. The video decoding method of claim 4, further comprising:
   in response to the determination result indicating that there is no need to decode the information that the IT circuit needs, setting the information that the IT circuit needs by default values.

6. The video decoding method of claim 4, wherein the information that the IT circuit needs comprises a syntax element lfnst_idx and a syntax element mts_idx; and before an end time of the residual decoding of the coding unit, the syntax element lfnst_idx and the syntax element mts_idx are determined in response to the determination result indicating that there is no need to decode the information that the IT circuit needs.

7. The video decoding method of claim 1, further comprising:
   during a process of the residual decoding of the coding unit, storing each coefficient of the coding unit into a buffer, wherein a buffer size of the buffer is smaller than a maximum data amount of coefficients possessed by one CU with a largest CU size.

8. The video decoding method of claim 1, wherein the information that the IT circuit needs comprises a syntax element lfnst_idx or a syntax element mts_idx.

9. A video decoding apparatus comprising:
   an entropy decoding circuit, arranged to perform residual decoding of a coding unit;
   an inverse transform (IT) circuit, arranged to apply inverse transform to transform blocks of the coding unit; and
   an inverse scan (IS) circuit, coupled between the entropy decoding circuit and the IT circuit, and arranged to re-order coefficients of the coding unit;
   wherein before the residual decoding of the coding unit is completed, at least one of the entropy decoding circuit and the IS circuit is arranged to determine whether the entropy decoding circuit needs to decode information that the IT circuit needs for applying the inverse transform to the transform blocks of the coding unit, to generate a determination result, and is further arranged to control coefficient transmission of the coding unit to the IT circuit according to the determination result.

10. The video decoding apparatus of claim 9, wherein the entropy decoding circuit obtains the available information before the residual decoding of the coding unit is started, and determines whether to decode the information that the IT circuit needs according to the available information.

11. The video decoding apparatus of claim 9, wherein the IS circuit obtains the available information during a process of the residual decoding of the coding unit performed by the entropy decoding circuit, and determines whether the entropy decoding circuit needs to decode the information that the IT circuit needs according to the available information.

12. The video decoding apparatus of claim 9, wherein when the determination result indicates that there is no need to decode the information that the IT circuit needs, the IS circuit starts the coefficient transmission of the coding unit before the residual decoding of the coding unit is completed by the entropy decoding circuit.

13. The video decoding apparatus of claim 12, wherein when the determination result indicates that there is no need to decode the information that the IT circuit needs, the information that the IT circuit needs is set by default values.

14. The video decoding apparatus of claim 12, wherein the information that the IT circuit needs comprises a syntax element lfnst_idx and a syntax element mts_idx; and before an end time of the residual decoding of the coding unit, the syntax element lfnst_idx and the syntax element mts_idx are determined in response to the determination result indicating that there is no need to decode the information that the IT circuit needs.

15. The video decoding apparatus of claim 9, wherein the IS circuit comprises a buffer for storing each coefficient of the coding unit that is generated from the residual decoding of the coding unit; and a buffer size of the buffer is smaller than a maximum data amount of coefficients possessed by one CU with a largest CU size.

16. The video decoding apparatus of claim 9, wherein the information that the IT circuit needs comprises a syntax element lfnst_idx or a syntax element mts_idx.

* * * * *